(12) United States Patent
Sijanec

(10) Patent No.: US 12,063,611 B2
(45) Date of Patent: Aug. 13, 2024

(54) BASE STATION FREQUENCY CONVERTOR WITH FREQUENCY MIXER

(71) Applicant: California Internet, L.P., Ventura, CA (US)

(72) Inventor: Boris Sijanec, Maribor (SL)

(73) Assignee: GLOBTEL HOLDING D.O.O., Maribor (SI)

( * ) Notice: Subject to any disclaimer, the term of this patent is extended or adjusted under 35 U.S.C. 154(b) by 0 days.

(21) Appl. No.: 17/226,867

(22) Filed: Apr. 9, 2021

(65) Prior Publication Data

US 2022/0330190 A1 Oct. 13, 2022

(51) Int. Cl.
*H04W 56/00* (2009.01)
*H04L 12/28* (2006.01)
*H04W 88/08* (2009.01)

(52) U.S. Cl.
CPC ..... *H04W 56/0035* (2013.01); *H04L 12/2801* (2013.01); *H04W 88/085* (2013.01)

(58) Field of Classification Search
CPC ............ H04W 56/0035; H04W 88/085; H04L 12/2801
See application file for complete search history.

(56) References Cited

U.S. PATENT DOCUMENTS

| | | | |
|---|---|---|---|
| 7,085,306 B1 | 8/2006 | Voldman et al. | |
| 2002/0126685 A1 | 9/2002 | Leatherbury et al. | |
| 2003/0002495 A1* | 1/2003 | Shahar | H04L 1/0025 370/465 |
| 2004/0068751 A1 | 4/2004 | Basawapatna et al. | |
| 2007/0032256 A1* | 2/2007 | Kolze | H04B 17/24 455/69 |
| 2011/0110415 A1 | 5/2011 | Cooper et al. | |
| 2012/0201338 A1 | 8/2012 | Leung et al. | |
| 2014/0094214 A1 | 4/2014 | Meyer et al. | |
| 2014/0155054 A1* | 6/2014 | Henry | H04W 16/26 455/422.1 |
| 2016/0028426 A1 | 1/2016 | Plevel | |
| 2017/0187406 A1 | 6/2017 | Talty et al. | |
| 2017/0207507 A1 | 7/2017 | Shih et al. | |
| 2019/0123442 A1 | 4/2019 | Vannucci et al. | |
| 2020/0252249 A1 | 8/2020 | Finkelstein | |
| 2021/0099131 A1 | 4/2021 | Connell et al. | |
| 2021/0266933 A1 | 8/2021 | Hong et al. | |
| 2021/0297141 A1 | 9/2021 | Schafer et al. | |

* cited by examiner

*Primary Examiner* — Sam K Ahn
*Assistant Examiner* — Amneet Singh
(74) *Attorney, Agent, or Firm* — Armstrong Teasdale LLP

(57) ABSTRACT

Provided are systems and methods for conversion and transmission of radio signals. A system for conversion and transmission of radio signals includes a frequency converter and a transmitter associated with a base station. The frequency converter is configured to receive, via a cable, a first radio signal having a predetermined frequency. The predetermined frequency is based on a Data over Cable Service Interface Specifications standard. The frequency converter is configured to convert the first radio signal into a second radio signal. The second radio signal has a frequency higher than the predetermined frequency. The transmitter is configured to wirelessly transmit the second radio signal to a customer premises equipment.

16 Claims, 9 Drawing Sheets

Receive, by a frequency converter associated with a base station, via a cable, a first radio signal having a predetermined frequency, the predetermined frequency being based on a DOCSIS standard
805

Convert the first radio signal into a second radio signal, the second radio signal having a frequency higher than the predetermined frequency
810

Wirelessly transmit, by a transmitter associated with the base station, the second radio signal to a customer premises equipment
815

FIG. 8

BASE STATION FREQUENCY CONVERTOR WITH FREQUENCY MIXER

TECHNICAL FIELD

This disclosure relates generally to data processing and, more particularly, to conversion and transmission of radio signals.

BACKGROUND

Cable television (CATV) systems deliver television programs to consumers via radio frequency signals and transmit signals through cables, such as coaxial cables or fiber-optic cables. The CATV systems are governed by Data over Cable Service Interface Specifications (DOCSIS) standards according to which high-bandwidth data transfer can be added to an existing CATV system. The DOCSIS 3.1 version supports the frequency of between 20 and 200 megahertz for a radio signal transmitted through cables in an upstream direction (to a CATV operator, or a network operator) and the frequency of between 200 megahertz and 1.2 gigahertz for a radio signal transmitted through cables in a downstream direction (to a client). The CATV systems are fully cable-based systems and do not transmit signals wirelessly. However, even if the CATV systems were to deliver the signals to customers wirelessly, the frequency stipulated by the DOCSIS standards (also referred to herein as "DOCSIS frequencies") and used by the CATV systems for signal transmission are currently assigned to other applications. For example, frequencies corresponding to the upstream DOCSIS frequencies are normally used by radio stations and frequencies corresponding to the DOCSIS downstream frequencies are used by mobile networks. Therefore, currently it is not possible for the CATV systems transmit signals having DOCSIS frequencies wirelessly.

Additionally, during conversions of radio signals to higher frequencies, the error rate multiplies rapidly when the resulting frequency is much higher than the original one. Thus, upon conversion, even a small inconsistency in signals having lower frequencies can result in large errors in signals of higher frequencies. When the radio signal is converted from DOCSIS frequencies to much higher frequencies, e.g., frequencies in the range of 70 or 80 gigahertz, any small error on the transmission side results in a significant error on the receiver side, with great loss of accuracy.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are systems and methods for conversion and transmission of radio signals. In some example embodiments, a system for conversion and transmission of radio signals may include a frequency converter associated with a base station and a transmitter associated with the base station. The frequency converter may be configured to receive, via a cable, a first radio signal having a predetermined frequency. The predetermined frequency may be based on a DOCSIS standard. The frequency converter may be configured to convert the first radio signal into a second radio signal. The second radio signal may have a frequency higher than the predetermined frequency. The transmitter may be configured to wirelessly transmit the second radio signal to a customer premises equipment.

In some example embodiments, a method for conversion and transmission of radio signals may commence with receiving, by a frequency converter associated with a base station, via a cable, a first radio signal having a predetermined frequency. The predetermined frequency may be based on a DOCSIS standard. The method may then continue with converting, via the first frequency converter, the first radio signal into a second radio signal. The second radio signal has a frequency higher than the predetermined frequency. The method may further include wirelessly transmitting, via a transmitter associated with the base station, the second radio signal to a customer premises equipment.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Exemplary embodiments are illustrated by way of example and not limitation in the figures of the accompanying drawings, in which like references indicate similar elements.

FIG. 8 is a flow diagram illustrating a method for conversion and transmission of radio signals, according to an example embodiment.

DETAILED DESCRIPTION

Figure 1:
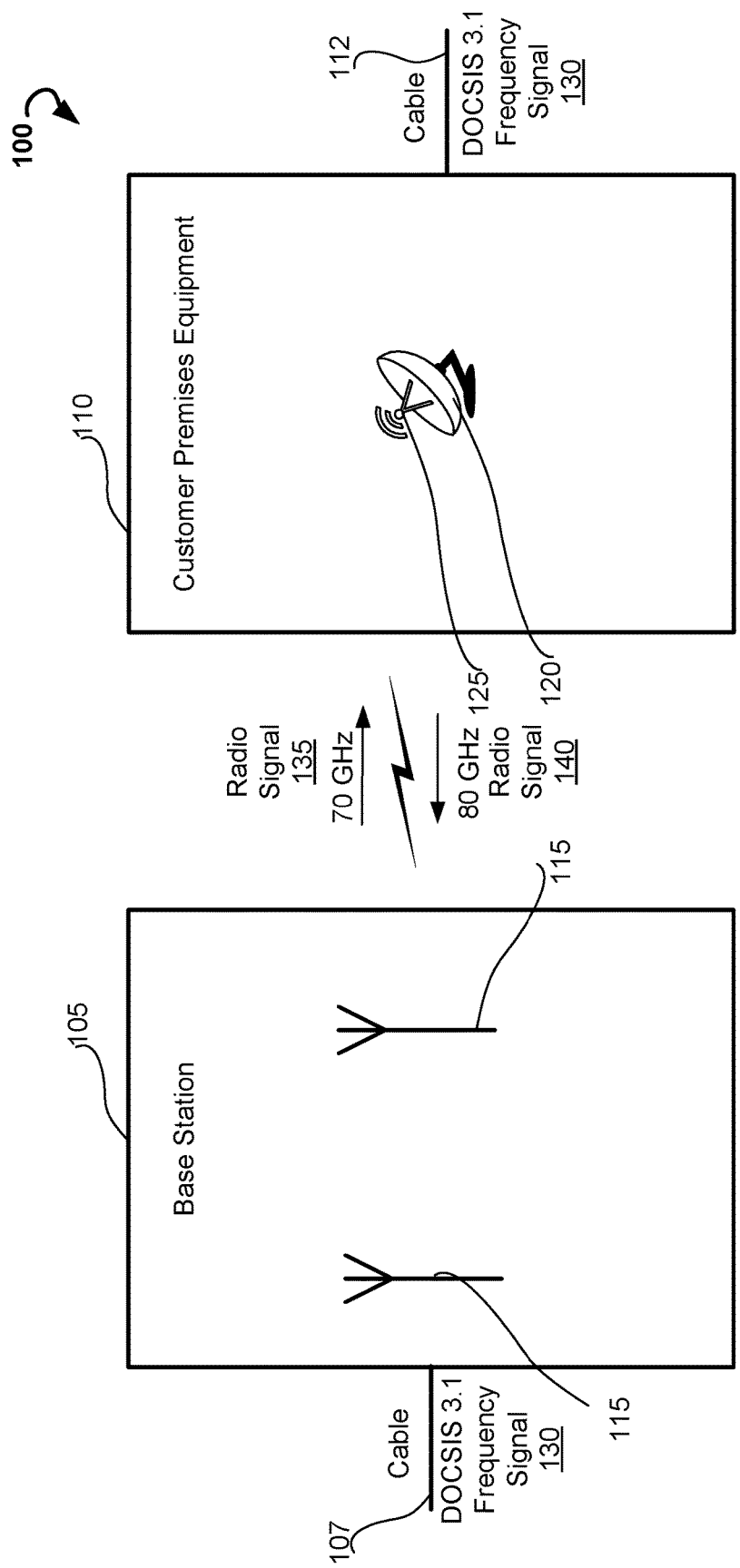
FIG. 1 illustrates an environment within which systems and methods for conversion and transmission of radio signals can be implemented, according to an example embodiment.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following detailed description is, therefore, not to be taken in a limiting sense and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The present disclosure relates to systems and methods for converting and transmitting radio signals. In telecommunications, data can be transferred over cable and have a frequency stipulated by a standard Data over Cable Service Interface Specifications (DOCSIS). Embodiments of the present disclosure are directed to conversion of a DOCSIS frequency signal received over cable into a high-frequency radio signal and wireless transmission of the high-frequency radio signal. As used herein, the term "high-frequency radio signal" signifies a radio signal having the frequency of about 70 or about 80 gigahertz that is transmitted wirelessly between a base station and customer premises equipment (CPE). As used herein, the term "about" modifies a value by referring to a range equal to the particular value plus or minus one (e.g., 70 plus or minus 1, 80 plus or minus 1). The frequencies of about 70 and about 80 gigahertz are within an Extremely High Frequency (EHF) band (30 to 300 gigahertz) according to the International Telecommunication Union (ITU) designation for bands of radio frequencies. As used herein, the frequencies of about 70 and about 80 gigahertz are referred to as "a transport frequency" used for wireless transmission of a radio signal between a base station and the CPE. Currently, the frequencies of about 70 and about 80 gigahertz are not dedicated to any licensed frequency bands.

According to DOCSIS version 3.1 (also referred to DOCSIS 3.1), data are transferred by cable in the form of two varying-amplitude sinusoidal carrier signals, also referred to herein as a first carrier signal and a second carrier signal. The two carrier signals have the same frequency and $\pi/2$ radians phase difference.

A system for conversion and transmission of radio signal may include a base station and a CPE. The base station may include a frequency converter, a frequency mixer, and a plurality of antennas for data transmission. The base station may receive, by wire, a radio signal from a telecommunications provider. The first radio signal may have a predetermined frequency based on the DOCSIS standard. The DOCSIS standard is a telecommunications standard according to which high-bandwidth data transfer can be added to an existing cable television system. The DOCSIS 3.1 supports the frequency of between 20 and 200 megahertz for a radio signal transmitted in an upstream direction (to a network operator) and the frequency of between 200 megahertz and 1.2 gigahertz for a radio signal transmitted in a downstream direction (to a client). According to the ITU designation, the frequencies supported by the DOCSIS standard are within a High Frequency (HF) band (between 3 and 30 megahertz), a Very High Frequency (VHF) band (from 30 to 300 megahertz), and an Ultra High Frequency (UHF) band (between 300 megahertz and 3 gigahertz).

In case of the conversion from the DOCSIS frequency to a frequency of about 70 or about 80 gigahertz, any small error on the transmission side can results in a significant error on the receiver side, with great loss of accuracy. To avoid the error multiplication issue during the frequency conversion, the initial error on the base station (a transmission side) is kept as low as possible such that the initial error does not multiply and does not become a significant error on the CPE side (a receiver side). Specifically, to reduce errors during the transmission, the base station is provided with a frequency mixer. The frequency mixer converts the first carrier signal having the DOCSIS frequency into a first converted carrier signal and converts the second carrier signal having the DOCSIS frequency into a second converted carrier signal. The first converted carrier signal and the second converted carrier signal need to be converted into signals having an intermediate frequency much lower than the DOCSIS frequency, for example, 200 kilohertz.

In view of the properties of the frequency mixer, even though the same intermediate frequency is set for the first converted carrier signal and the second converted carrier signal, the resulting intermediate frequency of the first converted carrier signal and second converted carrier signal may differ. For example, the first converted carrier signal may have the intermediate frequency of 200 kilohertz and the second converted carrier signal may have the intermediate frequency of 202 kilohertz.

The next step of the process is converting the first converted carrier signal and the second converted carrier signal into signals having an extremely high frequency of about 70 gigahertz. However, upon conversion, even the difference in several kilohertz (e.g., 200 kilohertz and 202 kilohertz) between the first converted carrier signal and the second converted carrier signal may result in a large error. Therefore, prior to the conversion, the first converted carrier signal and the second converted carrier signal need to be synchronized. The synchronization of the first converted carrier signal and the second converted carrier signal is performed by generating a clock signal for synchronizing the first converted carrier signal and the second converted carrier signal. The synchronization of two converted carrier signals at low frequencies (200 kilohertz) reduces the error during the conversion of the signals.

Upon synchronizing, the frequency converter of the base station converts the first converted carrier signal into a third carrier signal and converts the second converted carrier signal into a fourth carrier signal. The third carrier signal and the fourth carrier signal may have the extremely high frequency of about 70 gigahertz. Upon conversion, the base station may wirelessly transmit, via an antenna, the third carrier signal, the fourth carrier signal, and the clock signal in the form of a second radio signal to the CPE.

The CPE may receive the second radio signal (including the third carrier signal, the fourth carrier signal and the clock signal) and convert the third carrier signal and the fourth carrier signal having the frequency of about 70 gigahertz into the first carrier signal and the second carrier signal having the DOCSIS frequency. The first carrier signal and the second carrier signal may be provided to a customer by wire in the form of the first radio signal having the frequency of about 200 megahertz to 1.2 gigahertz.

Therefore, the base station converts down (i.e., reduces the frequency) the received radio signals having the predetermined DOCSIS frequency of between 200 megahertz and 1.2 gigahertz to intermediate signals having the intermediate frequency of about 200 kilohertz, synchronizes the intermediate signals, and converts up (i.e., increases the frequency) the synchronized intermediate signals into the resulting radio signals having the extremely high frequency of 70 gigahertz. To summarize, the frequency converter of the base station can convert a VHF/UHF radio signal supported by the DOCSIS standard and received by wire into an EHF radio signal for wireless transmission and avoid the error multiplication during the conversion.

Referring now to the drawings, FIG. 1 is an environment 100 in which systems and methods for conversion and transmission of radio signals can be implemented. The environment 100 may include a base station 105 and a CPE 110. The base station 105 may act as a radio receiver and a radio transmitter and serves as a gateway between a wired/cable network and a wireless network.

The base station 105 may receive a radio signal via a cable 107 from a cable telecommunications operator also referred to as a network operator (not shown). The base station 105 may have a plurality of antennas for transmission of the radio signal pre-processed by the base station 105 to the CPE 110. The radio signal received from the network operator may include a DOCSIS 3.1 frequency signal 130. The pre-processing of the DOCSIS 3.1 frequency signal 130 by the base station 105 may include conversion of the DOCSIS 3.1 frequency signal 130 into a radio signal 135 having the frequency of 70 gigahertz. The base station 105 may transmit the radio signal 135 wirelessly to the CPE 110 (downstream direction).

The antennas of the base station 105 are shown as sector antennas 115, which are directional microwave antennas with a sector-shaped pattern of signal radiation. A sector is a portion of the circumference of a circle measured in degrees of an arc, such as 60°, 90°, or 120°.

The CPE 110 is a telecommunications equipment located at premises of a telecommunication services subscriber. The CPE 110 may include home networking adapters, Internet access gateways, telephones, routers, switches, gateways, TV sets, and other devices that enable accessing telecommunication services and distributing the services in a building with a local area network (LAN).

The CPE 110 may have an antenna for receiving the radio signal from the base station 105. In an example embodiment, the antenna of the CPE 110 is a parabolic antenna 120. The parabolic antenna 120 may have a transceiver 125 for receiving the radio signal from the base station 105. Upon receipt of the radio signal, the CPE 110 may pre-process the radio signal 135 into DOCSIS 3.1 frequency signal 130 and provide the radio signal into DOCSIS 3.1 frequency signal 130 to the telecommunication services subscriber also referred to as a customer (not shown) associated with the CPE 110.

In an example embodiment, the CPE 110 may receive a radio signal via a cable 112 from the customer. The radio signal received from the customer may include a DOCSIS 3.1 frequency signal 130. The pre-processing of the DOCSIS 3.1 frequency signal 130 by the CPE 110 may include conversion of the DOCSIS 3.1 frequency signal 130 into a radio signal 140 having the frequency of 80 gigahertz. The CPE 110 may transmit, via the transceiver 125, the radio signal 140 wirelessly to the base station 105 (upstream direction). Upon receipt of the radio signal, the base station 105 may pre-process the radio signal 140 into DOCSIS 3.1 frequency signal 130 and provide the radio signal into DOCSIS 3.1 frequency signal 130 to the network operator.

Figure 2:
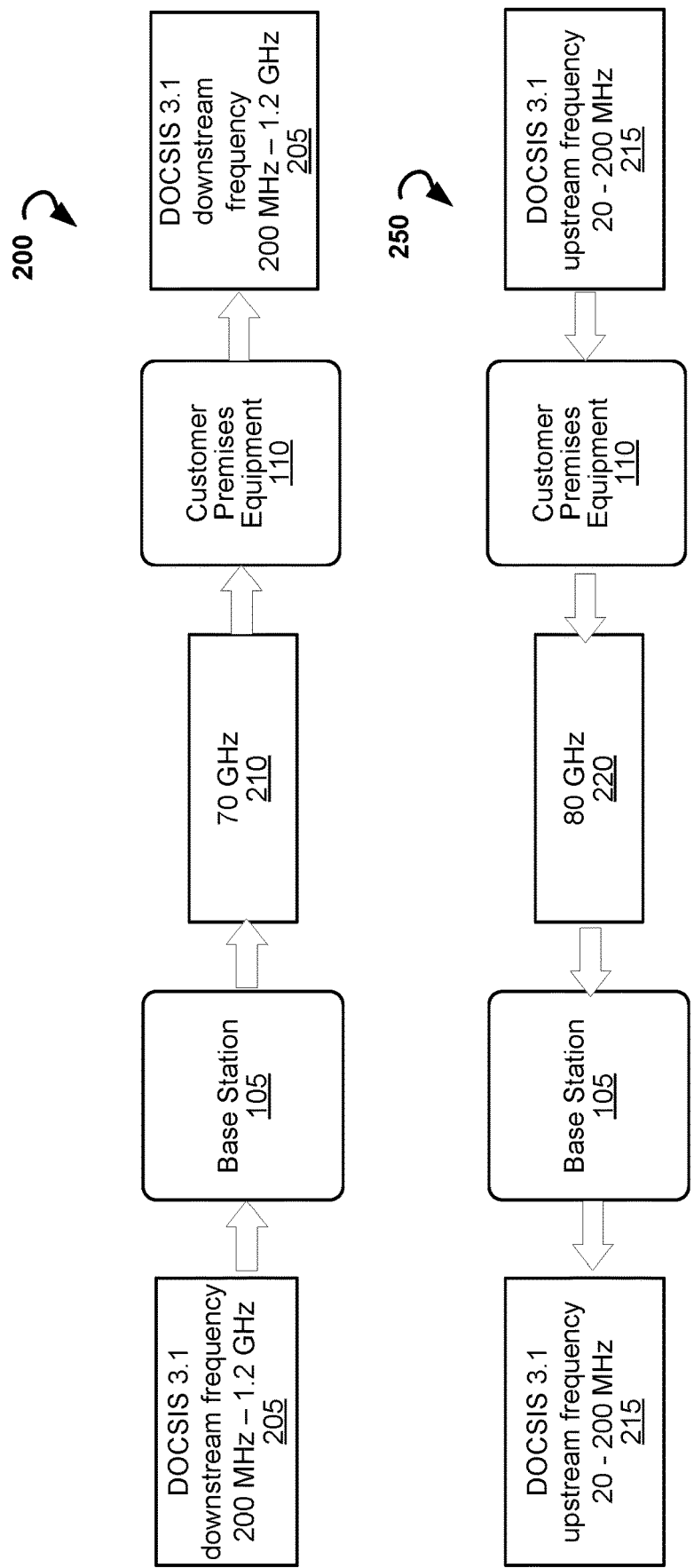
FIG. 2 is a block diagram showing transmission of radio signals between a base station and a customer premises equipment, according to an example embodiment

FIG. 2 is a block diagram showing transmission of radio signals between a base station and a CPE, according to an example embodiment. In an example embodiment of transmission of a radio signal in a downstream direction 200, the base station 105 receives a first radio signal 205 from a network provider via a cable. The first radio signal 205 may have DOCSIS 3.1 frequency stipulated for the downstream direction, for example, 200 megahertz-1.2 gigahertz. The base station 105 may perform a multi-stage conversion of the first radio signal 205 to obtain a second radio signal 210 having the frequency of 70 gigahertz. The base station 105 may wirelessly transmit the second radio signal 210 to the CPE 110. The CPE 110 may receive the second radio signal 210 and convert the second radio signal 210 into the first radio signal 205 having DOCSIS 3.1 frequency 200 megahertz-1.2 gigahertz. The CPE 110 may send the first radio signal 205 to a customer via a cable.

In an example embodiment of transmission of a radio signal in a downstream direction 250, the CPE receives a third radio signal 215 from the customer via the cable. The third radio signal 215 may have DOCSIS 3.1 frequency stipulated for the upstream direction, for example, 20-200 megahertz. The CPE 110 may perform a multi-stage conversion of the third radio signal 215 to obtain a fourth radio signal 220 having the frequency of 80 GHz. The CPE 110 may wirelessly transmit the fourth radio signal 220 to the base station 110. The base station 110 may receive the fourth radio signal 220 and convert the fourth radio signal 220 into the third radio signal 215 having DOCSIS 3.1 frequency 20-200 megahertz. The base station 110 may send the third radio signal 215 to the network provider via the cable.

Figure 3:
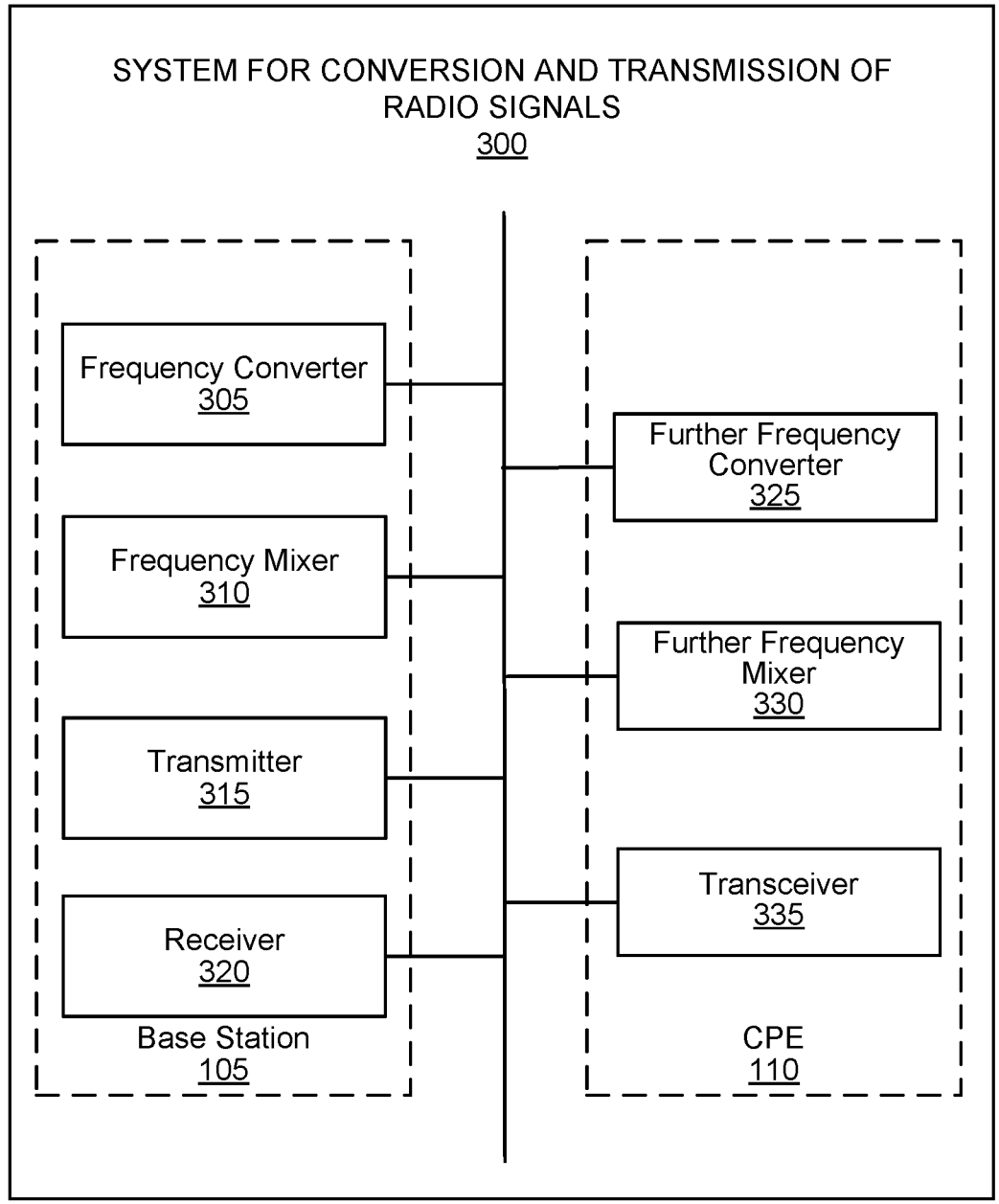
FIG. 3 is a block diagram illustrating a system for conversion and transmission of radio signals, according to an example embodiment.

FIG. 3 is a block diagram showing a system 300 for conversion and transmission of radio signals radio signals. The system 300 may include a base station 105 and a CPE 110. The base station 105 may include a frequency converter 305, a frequency mixer 310, a transmitter 315, and a receiver 320. The CPE 110 may include a further frequency converter 325, a further frequency mixer 330, and a transceiver 335. The structure of the base station 105 and the CPE 110 and the operations performed by the base station 105 and the CPE 110 are shown in detail with reference to FIGS. 4-8 below.

Figure 4:
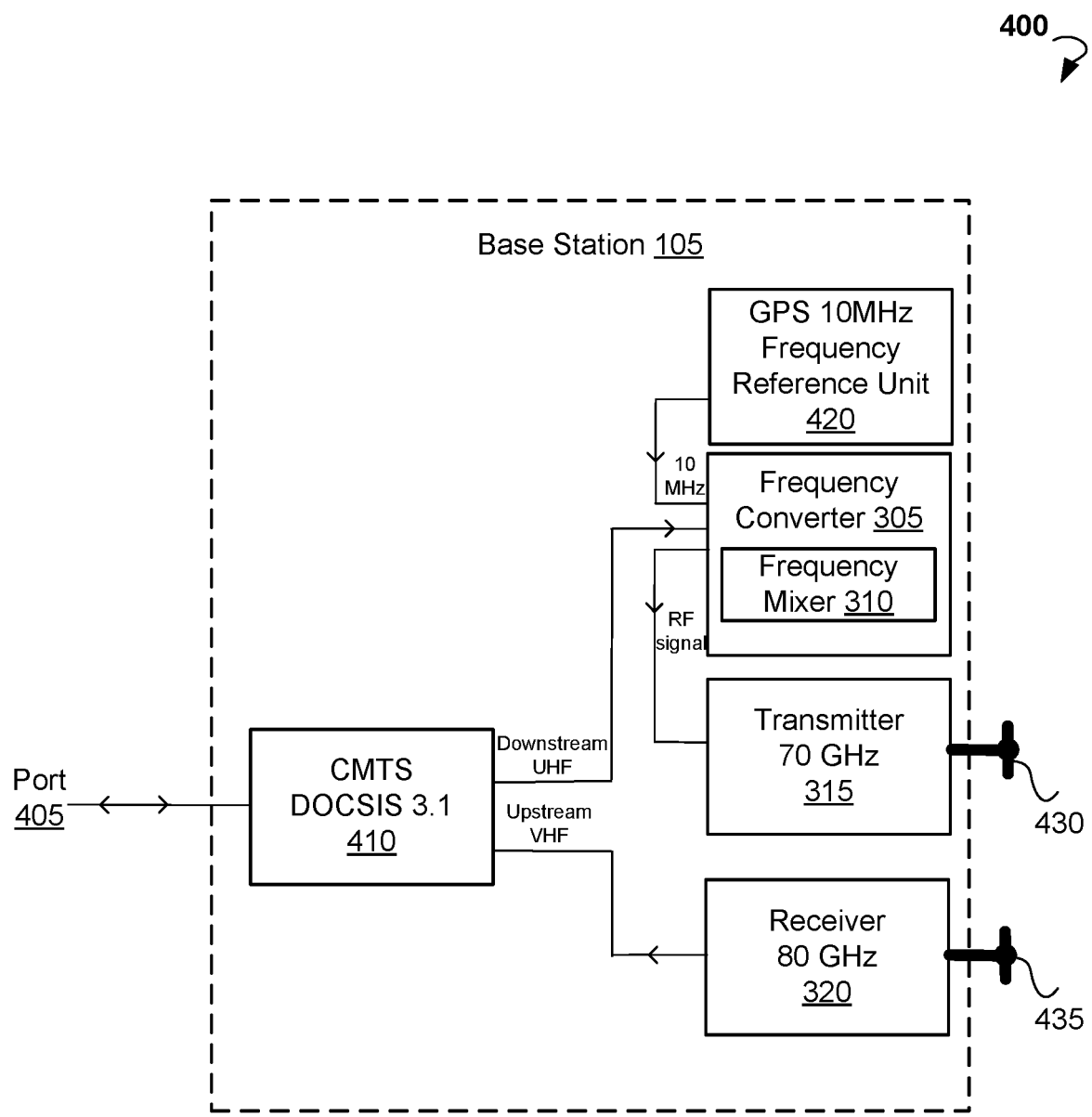
FIG. 4 is a schematic diagram showing a structure of a base station, according to an example embodiment.

FIG. 4 is a diagram 400 showing a structure of a base station 105, according to an example embodiment. The base station 105 may be connected to a port 405 for communicating radio signals to/from a telecommunications provider (a network operator). The base station 105 may have a cable modem termination system (CMTS) 410. The CMTS 410 can support DOCSIS 3.1 version. The CMTS 410 can host downstream and upstream ports. The CMTS 410 can receive a radio signal from the telecommunications provider to be sent downstream. The radio signal may be an UHF radio signal having the frequency according to the DOCSIS standard.

The base station 105 may have a frequency converter 305. The frequency converter 305 may receive, via a cable, a first radio signal provided by the telecommunications provider. Specifically, the frequency converter 305 may receive the first radio signal from the CMTS 410. The first radio signal may have a predetermined frequency based on the DOCSIS standard. In an example embodiment, the first radio signal has the frequency of between 200 megahertz and 1.2 gigahertz. The frequency converter 305 may be configured to convert, using a multi-stage conversion, the first radio signal into a second radio signal. The second radio signal has a frequency higher than the predetermined frequency. In an example embodiment, the frequency of the second radio signal may be 70 gigahertz. Therefore, the first radio signal having the predetermined frequency of between 200 megahertz and 1.2 gigahertz is converted into the second radio signal having the transport frequency of about 70 gigahertz.

The DOCSIS standard requires an extremely low phase noise in both downstream and upstream directions that are highly sensitive to errors. The frequency converter 305 can help achieving very high frequency modulations which were not possible with previous DOCSIS versions. In case of conversion of the radio signal from the DOCSIS frequency to 70 gigahertz frequency, any error in the radio signal multiplies such that any small error on the transmission side coverts into a significant error on the receiver side, and no frequency accuracy is achieved on the receiver side. To solve this problem, the initial error on the transmission side is kept as low as possible so that the error does not multiply and does not become a significant issue on the receiver side and does not impact the functionality of the CPE in general. To minimize the error during the conversion, a frequency mixer 310 associated with the based station 105 is provided. The operations performed by the frequency converter 305 and the frequency mixer 310 associated with the base station 105 are shown in detain in FIG. 5.

Figure 5:
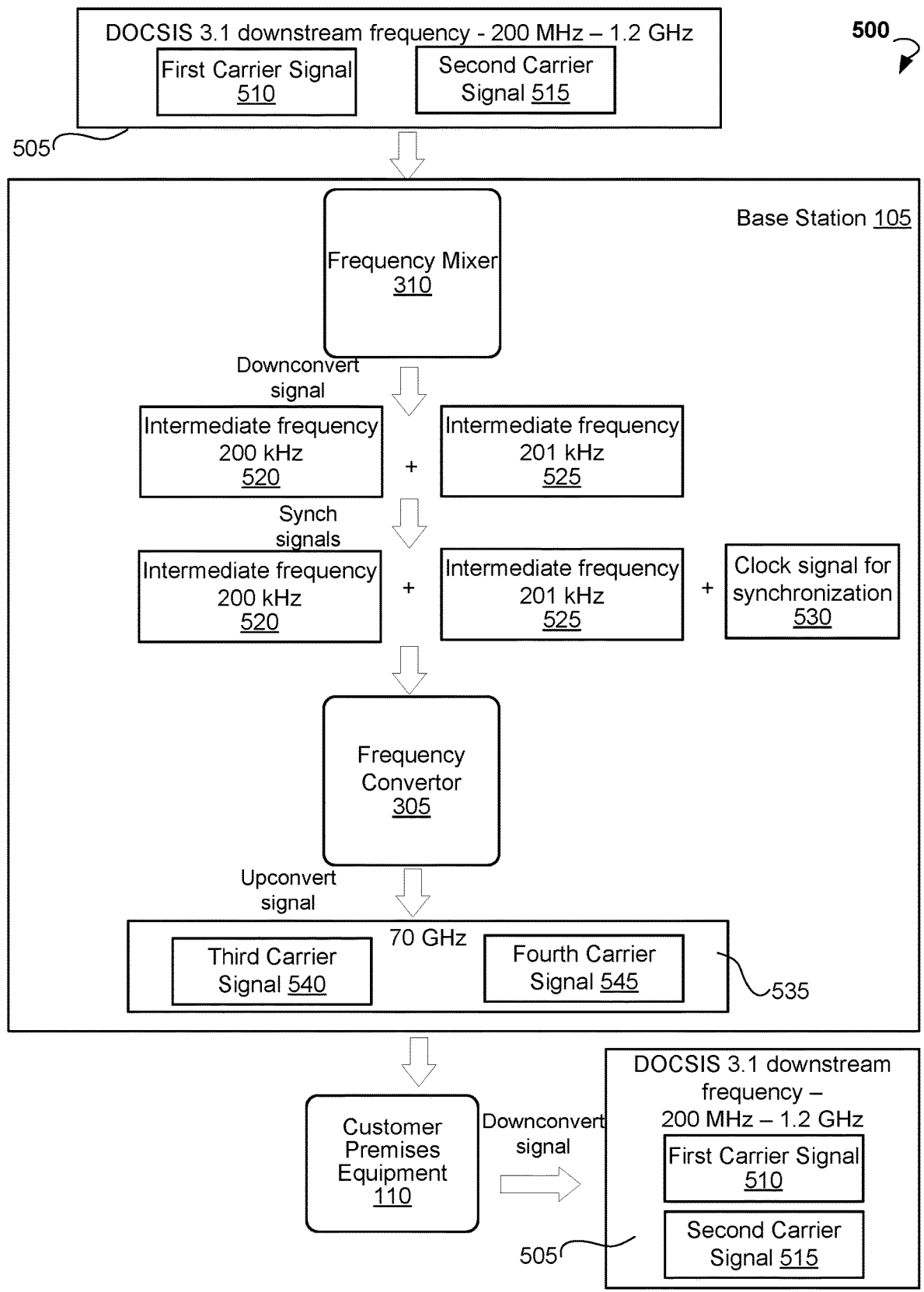
FIG. 5 is a block diagram showing conversion of a radio signal by a base station, according to an example embodiment.

FIG. 5 is a block diagram 500 showing conversion of a radio signal by the base station 105, according to an example embodiment. According to the DOCSIS standard, the first radio signal (shown as radio signal 505) received from the telecommunications provider may include a first carrier signal 510 and a second carrier signal 515. The first carrier signal 510 and the second carrier signal 515 have the predetermined frequency based on the DOCSIS standard.

The frequency mixer 310 may be configured to convert the first carrier signal 510 into a first converted carrier signal 520 having a first intermediate frequency. The first intermediate frequency of the first converted carrier signal 520 may be lower than the predetermined frequency of the first carrier signal 510. The frequency mixer 310 may be configured to convert the second carrier signal 515 into a second converted carrier signal 525 having a second intermediate frequency. The second intermediate frequency may be lower than the predetermined frequency.

Upon conversion, the frequency mixer 310 may compare the first intermediate frequency and the second intermediate frequency to determine whether the first intermediate frequency differs from the second intermediate frequency. Even though the same intermediate frequency may be set by the conversion process for the first converted carrier signal 515 and the second converted carrier signal 525, the resulting intermediate frequency of the first converted carrier signal 515 and the second converted carrier signal 525 may differ in view on physical properties of the frequency mixer 310. For example, the first converted carrier signal 520 may have the intermediate frequency of 200 kilohertz and the second converted carrier signal 525 may have the intermediate frequency of 202 kilohertz. Based on the determining that the first intermediate frequency differs from the second intermediate frequency, the frequency mixer 310 may synchronize the first converted carrier signal 520 and the second converted carrier signal 525 to have the same intermediate frequency. The intermediate frequency may be lower than the predetermined frequency. For example, the intermediate frequency may be 200 kilohertz. In an example embodiment, the synchronization of the first converted carrier signal 520 and the second converted carrier signal 525 may include generating a clock signal 530 for the synchronizing the first converted carrier signal 520 and the second converted carrier signal 525.

The conversion of the first radio signal 505 into a second radio signal 535 may be performed by the frequency converter 305 after the synchronization. Specifically, the conversion of the first radio signal 505 by the frequency converter 305 may include conversion of the first converted carrier signal 520 into a third carrier signal 540 having the frequency higher than the predetermined frequency. The conversion of the first radio signal 505 may further include converting the second converted carrier signal 525 into a fourth carrier signal 545 having the frequency higher than the predetermined frequency. The frequency of the third carrier signal 540 and the fourth carrier signal 545 may be about 70 gigahertz. In an example embodiment, the clock signal 530 may have the frequency of 70 gigahertz.

The third carrier signal 540, the fourth carrier signal 545, and the clock signal 530 may be transmitted by the base station 105 to the CPE 110 in the form of the second radio signal 535 having the frequency of about 70 gigahertz. Specifically, the base station 105 may further have at least one first antenna 430 shown in FIG. 4.

In an example embodiment, the at least one first antenna 430 may further include at least one filter. The filters may include bandpass filters configured to keep the frequency within a spectrum range that is allowed by authorities. For example, the filters may filter the radio signal to provide a radio signal in the 70.5 gigahertz to 71 gigahertz band spectrum range in one direction and in the 80 gigahertz to 81 gigahertz band spectrum range in another direction. The filters help to keep the signal within an unlicensed band. For example, if some part of the signal is in a licensed band, the filters may ensure that the frequency remains inside the unlicensed band.

The at least one first antenna may have a transmitter 315 and may be configured to transmit wirelessly, via the transmitter 315, the second radio signal 535 shown in FIG. 5 to the CPE 110. Therefore, the wireless transmission of the second radio signal 535 to the CPE 110 includes transmitting the third carrier signal 540, the fourth carrier signal 545, and the clock signal 530 to the CPE 110.

Referring to FIG. 4, in an example embodiment, the base station 105 may further have a Global Positioning System (GPS) frequency reference unit 420 (10 MHz). The GPS frequency reference unit 420 may be suited for use in many applications including telecommunications and may be configured to provide a 10 MHz frequency reference. The GPS frequency reference unit 420 may provide the frequency reference to the frequency converter 305.

Figure 6:
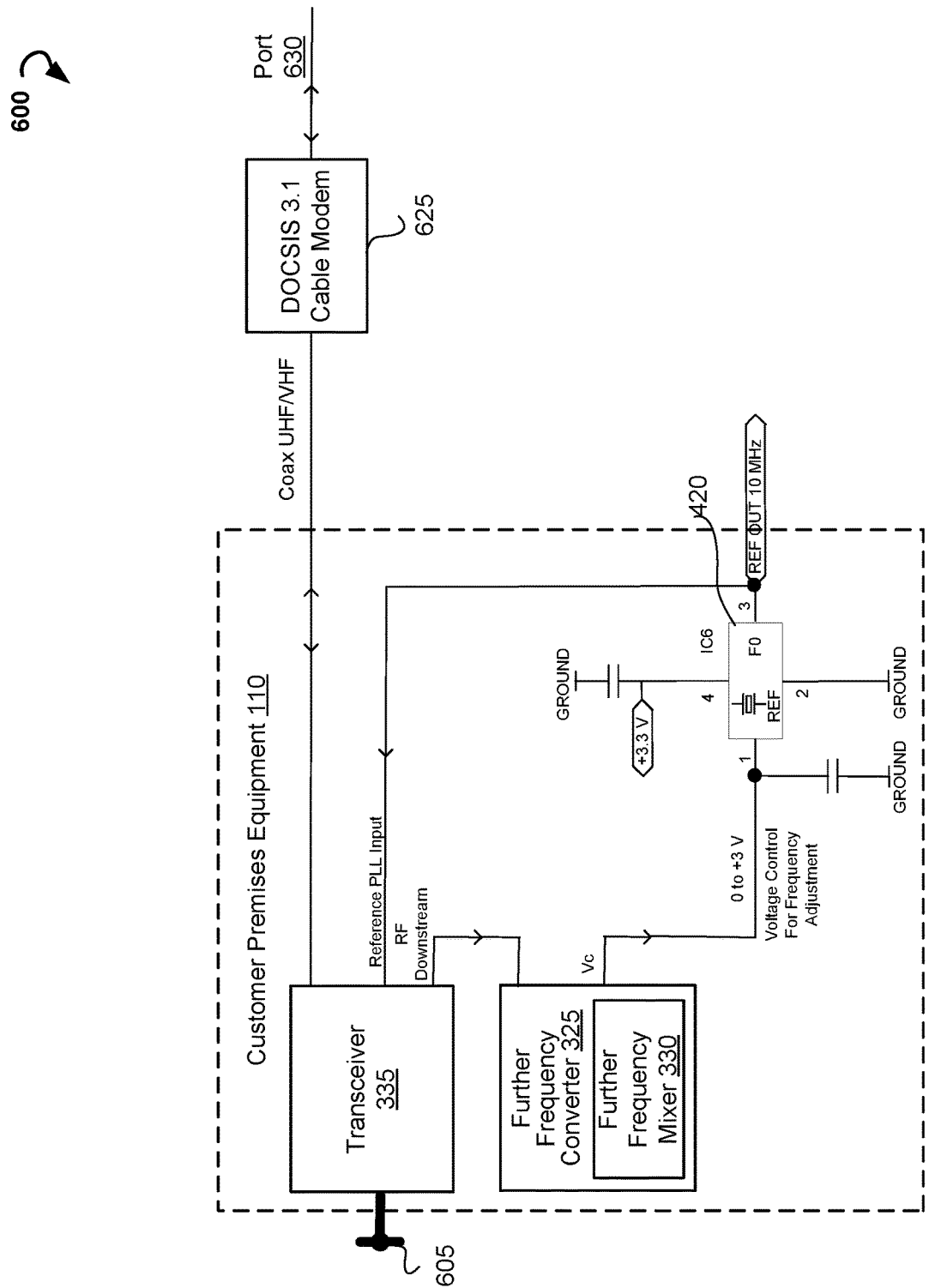
FIG. 6 is a block diagram showing a structure of customer premises equipment, according to an example embodiment.

FIG. 6 is a block diagram 600 showing a structure of a CPE 110, according to an example embodiment. The CPE 110 may have at least one second antenna. In an example embodiment, the at least one second antenna is a parabolic antenna 605. The at least one second antenna may have a transceiver 335 configured to receive the second radio signal 535 (as shown in FIG. 5) from the transmitter 315 of the base station 105 shown in FIG. 4. The CPE 110 may further have a further frequency converter 325. The transceiver 335 may receive the second radio signal 535 from the parabolic antenna 605 and provide the second radio signal 535 to the further frequency converter 325. The further frequency converter 325 may be configured to convert the second radio signal 535 into the first radio signal 505 having the predetermined frequency. Specifically, the second frequency converter 325 may convert the second radio signal 535 having the frequency of about 70 gigahertz into the first radio signal 505 having the predetermined frequency of between 200 megahertz and 1.2 gigahertz (i.e., the predetermined frequency according to the DOCSIS). The converted first radio signal 505 may include the first carrier signal 510 and the second carrier signal 515.

In an example embodiment, upon the conversion, the further frequency converter 325 may provide the first radio signal 505 to the voltage control for the frequency adjustment. The CPE 110 may further have a temperature compensated crystal oscillator (TCXO) frequency reference unit 620 for stabilizing the frequency. The TCXO frequency reference unit 620 may provide the first radio signal 505 to the transceiver 610, which, in turn, provides the first radio signal 505 to a cable modem 425 operating under the DOCSIS 3.1 version standard. The cable modem 625 may provide the first radio signal 505 to a port 530 for further relay of the first radio signal 505 to a customer associated with the CPE 110.

Figure 7:
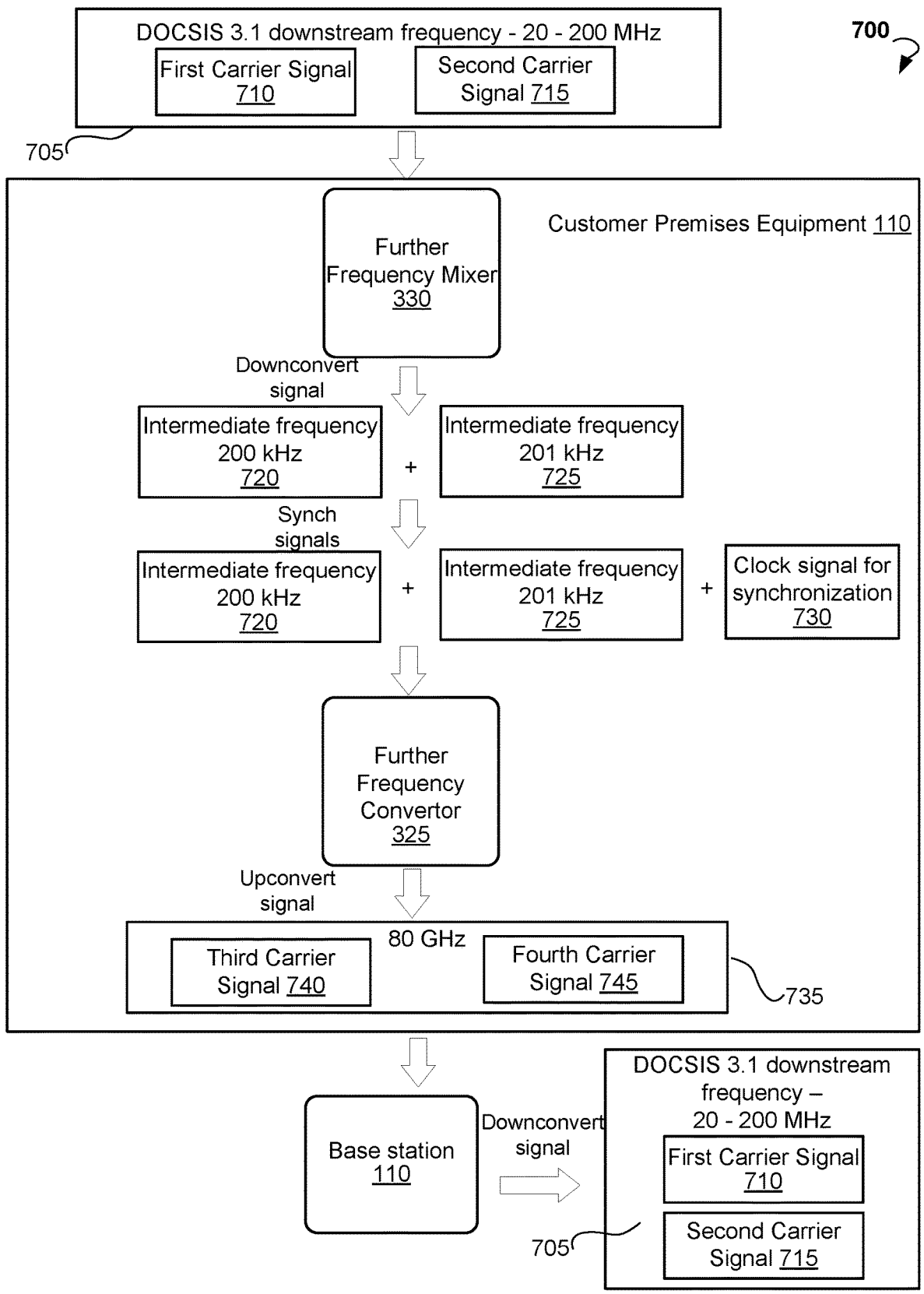
FIG. 7 is a block diagram showing conversion of a radio signal by customer premises equipment, according to an example embodiment.

FIG. 7 is a block diagram 700 showing conversion of a radio signal by the CPE 110, according to an example embodiment. In an example embodiment, the customer may request sending a radio signal to a telecommunications provider. Specifically, the CPE 110 may receive, from the customer, via the cable, the radio signal in the form of a first radio signal 705 having the predetermined frequency. In particular, the predetermined frequency of the first radio signal intended to be sent upstream may be between 20 and 200 megahertz (according to the DOCSIS standard for a radio signal to be transmitted in an upstream direction). The further frequency converter 325 may be configured to convert the first radio signal 705 into a third radio signal 735 of higher frequency than the predetermined frequency, for example, about 80 gigahertz. Specifically, according to the DOCSIS standard, the first radio signal 705 may include a first carrier signal 710 and a second carrier signal 715. The first carrier signal 710 and the second carrier signal 715 have the predetermined frequency based on the DOCSIS standard.

The further frequency mixer 330 may be configured to convert the first carrier signal 710 into a first converted carrier signal 720 having a first intermediate frequency. The first intermediate frequency of the first converted carrier signal 720 may be lower than the predetermined frequency of the first carrier signal 710. The frequency mixer 330 may be configured to convert the second carrier signal 715 into a second converted carrier signal 725 having a second intermediate frequency. The second intermediate frequency may be lower than the predetermined frequency.

Upon conversion, the frequency mixer 330 may compare the first intermediate frequency and the second intermediate frequency to determine whether the first intermediate frequency differs from the second intermediate frequency. Even though the same intermediate frequency may be set by the conversion process for the first converted carrier signal 715 and the second converted carrier signal 725, the resulting intermediate frequency of the first converted carrier signal 715 and the second converted carrier signal 725 may differ in view on physical properties of the frequency mixer 330. For example, the first converted carrier signal 720 may have the intermediate frequency of 200 kilohertz and the second converted carrier signal 725 may have the intermediate frequency of 202 kilohertz. Based on the determining that the first intermediate frequency differs from the second intermediate frequency, the frequency mixer 330 may synchronize the first converted carrier signal 720 and the second converted carrier signal 725 to have the same intermediate frequency. The intermediate frequency may be lower than the predetermined frequency. For example, the intermediate frequency may be 200 kilohertz.

In an example embodiment, the synchronization of the first converted carrier signal 720 and the second converted carrier signal 725 may include generating a clock signal 730 for the synchronizing the first converted carrier signal 720 and the second converted carrier signal 725.

The conversion of the first radio signal 705 into the third radio signal 735 may be performed by the further frequency converter 325 after the synchronization. Specifically, the conversion of the first radio signal 705 by the further frequency converter 325 may include conversion of the first converted carrier signal 720 into a third carrier signal 740 having the frequency higher than the predetermined frequency. The conversion of the first radio signal 705 may further include converting the second converted carrier signal 725 into a fourth carrier signal 745 having the frequency higher than the predetermined frequency. The frequency of the third carrier signal 740 and the fourth carrier signal 745 may be about 80 gigahertz. In an example embodiment, the clock signal 730 may have the frequency of 80 gigahertz.

The third carrier signal 740, the fourth carrier signal 745, and the clock signal 730 may be wirelessly transmitted by the transceiver 335 of the CPE 110 to the base station 105 in the form of the third radio signal 735 having the frequency of about 80 gigahertz.

Therefore, the further frequency converter 325 of the CPE 110 may convert the first radio signal 705 having the predetermined frequency between 20 and 200 megahertz into the third radio signal 735 having a transport frequency of 80 gigahertz. The CPE 110 may be configured to wirelessly transmit, via the transceiver 335, the third radio signal 735 to the base station 105.

Referring again to FIG. 4, the base station 105 may further include at least one third antenna 435. The at least one third antenna 435 may have a receiver 320 and may be configured to receive, via the receiver 320, the third radio signal 735 (shown in FIG. 7) from the CPE 110. Upon receipt of the third radio signal 735, the third radio signal 735 may be provided to the frequency converter 305 of the base station 105. The frequency converter 305 may be configured to convert the third radio signal 735 into the first radio signal 705. Specifically, the frequency converter 305 of the base station 105 may convert the third radio signal 735 having a transport frequency of about 80 gigahertz into the first radio signal 705 having the predetermined frequency between 20 and 200 megahertz. Upon conversion, the first radio signal 705 may be provided to the CMTS 310 for relay to the telecommunications provider.

FIG. 8 is a flow chart of a method 800 for conversion and transmission of radio signals, according to one example embodiment. The method 800 may commence with receiving, by a frequency converter associated with a base station, via a cable, a first radio signal having a predetermined frequency at operation 805. The predetermined frequency may be based on a DOCSIS standard.

The method 800 may further include converting the first radio signal into a second radio signal at operation 810. The second radio signal may have a frequency higher than the predetermined frequency. In an example embodiment, the first radio signal may be provided by a telecommunications provider and may include a first carrier signal and a second carrier signal having the predetermined frequency. Therefore, the conversion of the first radio signal may include conversion of the first carrier signal and the second carrier signal. Specifically, a frequency mixer associated with the based station may convert the first carrier signal into a first converted carrier signal having a first intermediate frequency and convert the second carrier signal into a second converted carrier signal having a second intermediate frequency. The first intermediate frequency and the second intermediate frequency may be lower than the predetermined frequency. Upon conversion, the frequency mixer may compare the first intermediate frequency and the second intermediate frequency to determine whether the first intermediate frequency differs from the second intermediate frequency. Based on the determining that the first intermediate frequency differs from the second intermediate frequency, the first converted carrier signal and the second converted carrier signal may be synchronized to have an intermediate frequency lower than the predetermined frequency. In an example embodiment, the synchronization of the first converted carrier signal and the second converted carrier signal may include generating a clock signal for the synchronizing the first converted carrier signal and the second converted carrier signal.

The conversion of the first radio signal into the second radio signal by the frequency converter may include converting the first converted carrier signal into a third carrier signal and converting the second converted carrier signal into a fourth carrier signal. The third carrier signal and the fourth carrier signal may have the frequency higher than the predetermined frequency.

The method 800 may further include wirelessly transmitting, by a transmitter associated with the base station, the second radio signal to a CPE at operation 815. The second radio signal may include the third carrier signal, the fourth carrier signal, and the clock signal. The second radio signal may have the frequency of about 70 gigahertz.

The method 800 may further include receiving, via a transceiver associated with the CPE, the second radio signal from the transmitter associated with the base station. The method 800 may continue with converting, via a further frequency converter associated with the CPE, the second radio signal into the first radio signal having the predetermined frequency.

In an example embodiment, the method 800 may further include receiving, by the further frequency converter associated with the CPE, via the cable, the first radio signal from a customer associated with the CPE. The method 800 may continue with converting, by the further frequency converter, the first radio signal into a third radio signal. The third radio signal may have a frequency higher than the predetermined frequency. In an example embodiment, the frequency of the third radio signal is about 80 gigahertz. The conversion may include a multi-stage conversion by the further frequency mixer and the further frequency converter of the CPE similarly to the multi-stage conversion performed by the frequency mixer and the frequency converter of the base station as described above. The method 800 may further include wirelessly transmitting, by the transceiver associated with the CPE, the third radio signal to the base station.

Figure 9:
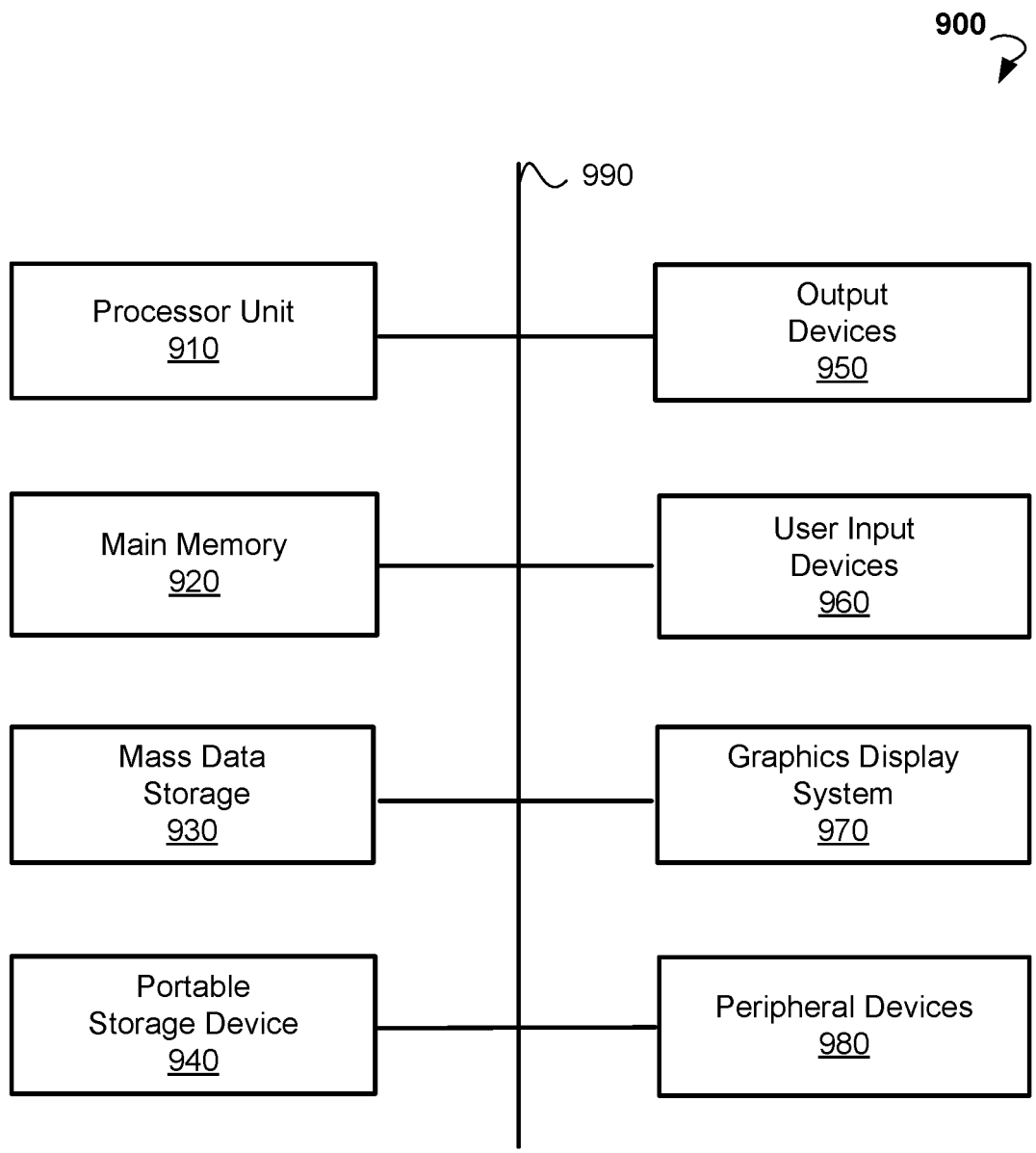
FIG. 9 is a computing system that can be used to implement a method for conversion and transmission of radio signals, according to an example embodiment.

FIG. 9 illustrates an exemplary computer system 900 that may be used to implement some embodiments of the present invention. The computer system 900 of FIG. 9 may be implemented in the contexts of the likes of computing systems, networks, servers, or combinations thereof. The computer system 900 of FIG. 9 includes one or more processor units 910 and main memory 920. Main memory 920 stores, in part, instructions and data for execution by processor units 910. Main memory 920 stores the executable code when in operation, in this example. The computer system 900 of FIG. 9 further includes a mass data storage 930, portable storage device 940, output devices 950, user input devices 960, a graphics display system 970, and peripheral devices 980.

The components shown in FIG. 9 are depicted as being connected via a single bus 990. The components may be connected through one or more data transport means. Processor unit 910 and main memory 920 is connected via a local microprocessor bus, and the mass data storage 930, peripheral device(s) 980, portable storage device 940, and graphics display system 970 are connected via one or more input/output (I/O) buses.

Mass data storage 930, which can be implemented with a magnetic disk drive, solid state drive, or an optical disk drive, is a non-volatile storage device for storing data and instructions for use by processor unit 910. Mass data storage 930 stores the system software for implementing embodiments of the present disclosure for purposes of loading that software into main memory 920.

Portable storage device 940 operates in conjunction with a portable non-volatile storage medium, such as a flash drive, floppy disk, compact disk, digital video disc, or Universal Serial Bus (USB) storage device, to input and output data and code to and from the computer system 900 of FIG. 9. The system software for implementing embodiments of the present disclosure is stored on such a portable medium and input to the computer system 900 via the portable storage device 940.

User input devices 960 can provide a portion of a user interface. User input devices 960 may include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 as shown in FIG. 9 includes output devices 950. Suitable output devices 950 include speakers, printers, network interfaces, and monitors.

Graphics display system 970 include a liquid crystal display (LCD) or other suitable display device. Graphics display system 970 is configurable to receive textual and graphical information and processes the information for output to the display device.

Peripheral devices 980 may include any type of computer support device to add additional functionality to the computer system.

The components provided in the computer system 900 of FIG. 9 are those typically found in computer systems that may be suitable for use with embodiments of the present disclosure and are intended to represent a broad category of such computer components that are well known in the art. Thus, the computer system 900 of FIG. 9 can be a personal computer (PC), handheld computer system, telephone, mobile computer system, workstation, tablet, phablet, mobile phone, server, minicomputer, mainframe computer, wearable device, an Internet-of-things (IOT) device/system, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

The processing for various embodiments may be implemented in software that is cloud-based. In some embodiments, the computer system 900 is implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 900, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, various embodiments of methods and systems for conversion and transmission of radio signals have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

The invention claimed is:

1. A system for conversion and transmission of radio signals, the system comprising:
   a frequency converter associated with a base station, the frequency converter being configured to:
   receive, via a cable, a first radio signal having a predetermined frequency, the predetermined frequency being based on a Data over Cable Service Interface Specifications (DOCSIS) standard, wherein the first radio signal is provided by a telecommunications provider and includes a first carrier signal and a second carrier signal, the first carrier signal and the second carrier signal having the predetermined frequency; and
   convert the first radio signal into a second radio signal, the second radio signal having a frequency higher than the predetermined frequency;
   a frequency mixer associated with the based station, the frequency mixer being configured to:
   convert the first carrier signal into a first converted carrier signal having a first intermediate frequency, the first intermediate frequency being lower than the predetermined frequency;
   convert the second carrier signal into a second converted carrier signal having a second intermediate frequency, the second intermediate frequency being lower than the predetermined frequency;
   compare the first intermediate frequency and the second intermediate frequency to determine whether the first intermediate frequency differs from the second intermediate frequency;
   based on the determining that the first intermediate frequency differs from the second intermediate frequency, synchronize the first converted carrier signal and the second converted carrier signal to have an intermediate frequency, the intermediate frequency being lower than the predetermined frequency; and
   a transmitter associated with the base station, the transmitter being configured to wirelessly transmit the second radio signal to a customer premises equipment (CPE).

2. The system of claim 1, further comprising
   a transceiver associated with the CPE, the transceiver being configured to receive the second radio signal from the transmitter associated with the base station; and
   a further frequency converter associated with the CPE, the further frequency converter being configured to convert the second radio signal into the first radio signal having the predetermined frequency.

3. The system of claim 2, wherein the further frequency converter associated with the CPE is further configured to:
   receive, via the cable, the first radio signal from a customer associated with the CPE;
   convert the first radio signal into a third radio signal, the third radio signal having a frequency higher than the predetermined frequency; and
   the transceiver associated with the CPE is further configured to wirelessly transmit the third radio signal to the base station.

4. The system of claim 3, wherein the frequency of the third radio signal is about 80 gigahertz.

5. The system of claim 1, wherein the frequency of the second radio signal is about 70 gigahertz.

6. The system of claim 1, wherein the converting the first radio signal into the second radio signal by the frequency converter includes:
   converting the first converted carrier signal into a third carrier signal having the frequency higher than the predetermined frequency;
   converting the second converted carrier signal into a fourth carrier signal having the frequency higher than the predetermined frequency; and
   wherein the second radio signal includes the third carrier signal and the fourth carrier signal.

7. The system of claim 6, wherein the synchronizing the first converted carrier signal and the second converted carrier signal includes generating a clock signal for the synchronizing the first converted carrier signal and the second converted carrier signal, the clock signal being transmitted to the CPE in the second radio signal.

8. The system of claim 7, wherein the wireless transmitting the second radio signal to the CPE includes transmitting the third carrier signal, the fourth carrier signal, and the clock signal.

9. A method for conversion and transmission of radio signals, the method comprising:
   receiving, by a frequency converter associated with a base station, via a cable, a first radio signal having a predetermined frequency, the predetermined frequency being based on a Data over Cable Service Interface Specifications (DOCSIS) standard;
   converting the first radio signal into a second radio signal, the second radio signal having a frequency higher than the predetermined frequency, wherein the first radio signal is provided by a telecommunications provider and includes a first carrier signal and a second carrier signal, the first carrier signal and the second carrier signal having the predetermined frequency;

converting, by a frequency mixer associated with the based station, the first carrier signal into a first converted carrier signal having a first intermediate frequency, the first intermediate frequency being lower than the predetermined frequency;

converting, by the frequency mixer, the second carrier signal into a second converted carrier signal having a second intermediate frequency, the second intermediate frequency being lower than the predetermined frequency;

comparing, by the frequency mixer, the first intermediate frequency and the second intermediate frequency to determine whether the first intermediate frequency differs from the second intermediate frequency;

based on the determining that the first intermediate frequency differs from the second intermediate frequency, synchronizing the first converted carrier signal and the second converted carrier signal to have an intermediate frequency, the intermediate frequency being lower than the predetermined frequency; and wirelessly transmitting, by a transmitter associated with the base station, the second radio signal to a customer premises equipment (CPE).

10. The method of claim 9, further comprising receiving, via a transceiver associated with the CPE, the second radio signal from the transmitter associated with the base station; and converting, via a further frequency converter associated with the CPE, the second radio signal into the first radio signal having the predetermined frequency.

11. The method of claim 10, further comprising:

receiving, by the further frequency converter associated with the CPE, via the cable, the first radio signal from a customer associated with the CPE;

converting, by the further frequency converter, the first radio signal into a third radio signal, the third radio signal having a frequency higher than the predetermined frequency; and wirelessly transmitting, by the transceiver associated with the CPE, the third radio signal to the base station.

12. The method of claim 11, wherein the frequency of the second radio signal is about 70 gigahertz and the frequency of the third radio signal is about 80 gigahertz.

13. The method of claim 9, wherein the converting the first radio signal into the second radio signal by the frequency converter includes:

converting the first converted carrier signal into a third carrier signal having the frequency higher than the predetermined frequency;

converting the second converted carrier signal into a fourth carrier signal having the frequency higher than the predetermined frequency; and wherein the second radio signal includes the third carrier signal and the fourth carrier signal.

14. The method of claim 13, wherein the synchronizing the first converted carrier signal and the second converted carrier signal includes generating a clock signal for the synchronizing the first converted carrier signal and the second converted carrier signal, the clock signal being transmitted to the CPE in the second radio signal.

15. The method of claim 14, wherein the wireless transmitting the second radio signal to the CPE includes transmitting the third carrier signal, the fourth carrier signal, and the clock signal.

16. A system for conversion and transmission of radio signals, the system comprising:

a frequency converter associated with a base station, the frequency converter being configured to:

receive, via a cable, a first radio signal having a predetermined frequency, the predetermined frequency being based on a Data over Cable Service Interface Specifications (DOCSIS) standard, wherein the first radio signal is provided by a telecommunications provider and includes a first carrier signal and a second carrier signal, the first carrier signal and the second carrier signal having the predetermined frequency; and convert the first radio signal into a second radio signal, the second radio signal having a frequency higher than the predetermined frequency;

a frequency mixer associated with the based station, the frequency mixer being configured to:

convert the first carrier signal into a first converted carrier signal having a first intermediate frequency, the first intermediate frequency being lower than the predetermined frequency;

convert the second carrier signal into a second converted carrier signal having a second intermediate frequency, the second intermediate frequency being lower than the predetermined frequency;

compare the first intermediate frequency and the second intermediate frequency to determine whether the first intermediate frequency differs from the second intermediate frequency; and based on the determining that the first intermediate frequency differs from the second intermediate frequency, synchronize the first converted carrier signal and the second converted carrier signal to have an intermediate frequency, the intermediate frequency being lower than the predetermined frequency;

wherein the converting the first radio signal into the second radio signal by the frequency converter includes:

converting the first converted carrier signal into a third carrier signal having the frequency higher than the predetermined frequency; and converting the second converted carrier signal into a fourth carrier signal having the frequency higher than the predetermined frequency;

wherein the second radio signal includes the third carrier signal and the fourth carrier signal; and a transmitter associated with the base station, the transmitter being configured to wirelessly transmit the second radio signal to a customer premises equipment (CPE).

* * * * *